Patented Apr. 15, 1947

2,419,009

UNITED STATES PATENT OFFICE 2,419,009

VINYL FLUORIDE COPOLYMERS

Donald D. Coffman and Thomas A. Ford, Wilmington, Del., assignors to E. I. du Pont de Nemours & Company, Wilmington, Del., a corporation of Delaware No Drawing. Application November 19, 1943, Serial No. 510,965

8 Claims. (Cl. 260—86)

This invention relates to polymeric materials and more particularly to new resinous and plastic compositions.

Vinyl fluoride or fluoroethylene has been long known to the art. Although it is formally a vinyl halide, vinyl fluoride has been set apart from the other vinyl halides, i. e., vinyl chloride, vinyl bromide, and vinyl iodide, by the fact that it is difficult to polymerize while the chloride, bromide and iodide polymerize with ease. In many instances processes described as applicable to polymerization of the vinyl halides in general do not in fact yield the vinyl fluoride polymer. In the case of those processes known for the manufacture of vinyl fluoride polymer, polymers are obtained which, like those formed from the other vinyl halides, are brittle and friable. In our copending application, Serial No. 510,966, filed of even date herewith, we have described a new method by means of which vinyl fluoride is readily polymerized and which, furthermore, yields a vinyl fluoride polymer having new and unusual properties. Although the limited solubility and high softening temperature of these polymers are very advantageous in many applications, these properties, however, are undesirable for certain uses.

This invention has as an object a new and valuable method for obtaining polymeric products from vinyl fluoride. A further object is the production from vinyl fluoride of new polymeric products of high molecular weight which have certain of the desirable properties of polyvinyl fluoride in combination with other valuable properties such as a wider range of solubility, improved workability, etc. Still further objects reside in methods for obtaining the above mentioned polymeric materials. Other objects will appear hereinafter.

The above objects are accomplished by heating a mixture of vinyl fluoride with at least one other polymerizable organic compound having at least one ethylenic double bond and a small proportion of a vinyl polymerization catalyst under polymerizing conditions at superatmospheric pressure and at a temperature below the decomposition temperature of the monomers and of the polymeric products so formed. More particularly, the invention claimed herein is carried out by the use of terminally unsaturated olefins, preferably the terminally unsaturated monoolefins, as the second polymerizable constituent of the mixture and by conducting the polymerization under a pressure of at least 100 atmospheres. By this means, new compositions of matter comprising the interpolymers which are more particularly referred to hereinafter, and which have unique and valuable properties, are obtained.

The interpolymerization of vinyl fluoride with the polymerizable organic compound containing at least one ethylenic double bond is carried out at a pressure in excess of 50 atmospheres and it must consequently be conducted in a suitable high pressure vessel. A convenient apparatus is one which is capable of withstanding pressures up to 1000 or more atmospheres, fabricated of or lined with a corrosion-resistant material such as stainless steel or silver, and equipped with devices for recording and controlling the internal temperature and pressure. Some means of agitation is advantageous, and this may conveniently be provided by imparting a shaking or rocking motion to the reaction vessel as a whole. It is likewise advantageous to have the reactor provided with an inlet line through which one or more of the reactants may be added as the reaction proceeds, and this may be of flexible construction if motion is to be imparted to the reactor itself as a means of providing agitation.

It is desirable to include a safety rupture disc in the reaction system to ensure that the safe operating pressure of the equipment is not exceeded. The reaction is exothermic, and if the temperature is not properly controlled, a rapid rise in temperature and pressure may occur. For this reason the reaction is best carried out in the presence of a non-reactive liquid medium to facilitate agitation and to act as a heat transfer agent, thus assisting in controlling the reaction temperature. Water is especially useful as a reaction medium as it helps prevent such flash reactions because of its high specific heat and its ability to conduct heat from the gas phase to the walls of the reaction vessel.

Since vinyl fluoride is usually a gas under the conditions of polymerization, the reaction is attended by a drop in pressure in the reactor, and the pressure may be maintained constant or within a desired range by continuously or intermittently injecting additional quantities of one or more of the reaction ingredients into the reactor, or by injecting additional quantities of the liquid medium if such is employed. The course of the reaction can be followed by observing the quantity of material injected to keep the pressure constant or by injecting intermittently and noting the rate at which the pressure falls between injections.

The pressure and temperature employed will depend upon the nature of the other monomer to be interpolymerized with the vinyl fluoride, and upon the polymer composition and properties desired. The manner in which these variables depend upon one another will be illustrated in the examples and discussed more fully thereafter. Pressures of 50 atmospheres or more are necessary to obtain satisfactory utilization of the vinyl fluoride in the reaction mixture since below 50 atmospheres vinyl fluoride does not interpolymerize readily with the other component or components and the interpolymerization product contains only a very small amount of vinyl fluoride in comparison with the proportion used in the starting materials. Temperatures in the range of 50°–150° C. are preferred.

Any of a wide variety of compounds known to the chemist as vinyl polymerization catalysts may be used to induce the interpolymerization reaction. Organic peroxides, e. g., benzoyl peroxide or diethyl peroxide, are especially suitable as catalysts, and concentrations of .005% to 2% are generally sufficient. The catalyst may be injected during the reaction along with one of the other ingredients, or the reaction may be run as a batch process, in which case it is convenient simply to add the catalyst to the reaction vessel before closing. In the latter case the reaction will slow down as the catalyst becomes exhausted, and when the pressure no longer falls at a measurable rate the reaction is considered to be complete.

Vinyl fluoride can be prepared in several ways, a convenient process being that of United States Patent 2,118,901. Oxygen and acetylene are undesirable impurities and should be reduced to a practical minimum by careful distillation or scrubbing with suitable agents. It is likewise desirable to remove all air from the apparatus prior to the operation by evacuation or sweeping with an inert gas such as nitrogen. Water, if used, should be pure and free of oxygen. Distilled water which has been boiled and stored under oxygen-free nitrogen is satisfactory.

Although the best products are obtained by the copolymerization of a mixture of vinyl fluoride and the other polymerizable organic compound containing from 5% to 97% of the latter and from 95% to 3% vinyl fluoride, based on the weight of the two ingredients, the process can be operated with advantage wherein this percentage is somewhat lower, e. g., from 1% to 5% of the mentioned other polymerizable compound and from 99% to 95% of vinyl fluoride.

The interpolymers are generally obtained in the present process as powdery, granular, or massive spongy or solid forms, and they may be freed of unreacted monomeric materials, e. g., by heating, vacuum drying or treatment with solvents. Washing with water or suitable solvent or reagents to remove catalyst residues is desirable, although not necessary.

The present process provides a method by means of which interpolymers of vinyl fluoride and other ethylenically unsaturated organic compounds, previously made with considerably more difficulty than interpolymers of the other vinyl halides, are readily obtained in high yield. By the use of an olefin, and particularly a terminally unsaturated olefin containing not more than five carbon atoms, as the polymerizable component other than the vinyl fluoride, new polymeric products are obtained which are useful in such applications as moisture-proof wrapping films, dimensionally stable molded articles, wrapping films and electrical insulation.

The invention is further illustrated by the following examples in which the parts are by weight.

*Example I*

A cylindrical reactor fabricated of stainless steel and designed to withstand a pressure in excess of 1000 atmospheres is flushed with pure oxygen-free nitrogen and charged with 25 parts of deoxygenated water and 0.1 part of benzoyl peroxide. The water occupies approximately one-fourth of the total internal volume of the vessel. The reactor is then closed by a head bearing an inlet valve and a thermocouple well, using an aluminum gasket at the point of closure. The nitrogen is removed by evacuating to constant pressure, and 20 parts of vinyl fluoride is then admitted, with cooling if necessary. The reactor is then placed in a reciprocating mechanism designed to produce vigorous agitation of the contents. The reactor is provided with external heating and cooling devices which may be operated both manually and automatically by a temperature recording and controlling instrument which is connected with the thermocouple measuring the internal temperature. The inlet valve is opened to a flexible high pressure line which is connected to a pressure gauge and a safety rupture disc designed to blow out at a pressure slightly above 1000 atmospheres. This system is connected through a valve to a storage system containing purified ethylene (containing less than 20 P. P. M. oxygen) under a pressure of about 1000 atmospheres.

Ethylene is admitted to the reaction system from the high pressure storage to provide a total pressure of about 50 atmospheres at room temperature, heating is commenced, and agitation is begun. When the internal temperature reaches 80° C. the pressure in the reactor is raised to 700 atmospheres by injection of the requisite additional quantity of ethylene. The reaction gathers velocity, as evidenced by an increasingly rapid drop in pressure, and it may be necessary to cool the reaction vessel to prevent the temperature from rising above 80° C. The temperature is maintained at 80° C. and additional ethylene is injected as often as required to maintain the pressure within the range 610–700 atmospheres. The sum of the individual pressure drops during the periods between repressuring operations over 11.5 hours is about 490 atmospheres. At the end of this time the pressure is dropping only very slowly showing that the catalyst is exhausted. The reaction vessel is then cooled to room temperature, the unreacted portion of the gaseous monomers is bled off, and the contents of the reactor are discharged. The white cake of vinyl fluoride-ethylene interpolymer is washed with water and dried under reduced pressure at 100° C. to yield 14 parts of product when dry.

This vinyl fluoride-ethylene interpolymer contains 9.17% fluorine, corresponding to 22% of vinyl fluoride by weight. The molar ratio of vinyl fluoride to ethylene in this interpolymer is hence about 1:6. The interpolymer is completely soluble in hot xylene, in contrast to pure polyvinyl fluoride, which is insoluble in hydrocarbon solvents. The interpolymer has an intrinsic viscosity of 2.14 (0.0625 g./50 ml. xylene at 85° C.), which is extremely high. The vinyl fluoride-ethylene interpolymer can be pressed at 150° C. and 5000 lbs./sq. in. to give a tough pliable film. The film has a tensile strength, based on the original dimensions, of about 2200 lbs./sq. in. and a bending stiffness, expressed in terms of Young's modulus, of .047×10⁶. The sticking temperature, i. e., the temperature at which the film shows the first signs of sticking to a copper block when heated under a pressure of about 0.1 kg./sq. cm., is 70°-80° C. Polyethylene prepared under these conditions has a sticking temperature of 50°-60° C.

Tough, transparent foils can be cast from a 10% solution of the polymer in hot xylene; these foils exhibit remarkable clarity and resistance to tear.

When the reaction is carried out in similar fashion with the modification that the quantity of vinyl fluoride charged is 50 parts, the product is 23 parts of a vinyl fluoride-ethylene interpolymer containing 26.63% fluorine or about 64.5% vinyl fluoride by weight. The molar ratio of vinyl fluoride to ethylene in this interpolymer is hence 1.1:1. The 1.1:1 vinyl fluoride-ethylene interpolymer can be pressed at 150° C. and 5000 lbs./sq. in. to give a tough pliable film having a stiffness expressed in terms of Young's modulus of 0.049×10⁶. Its sticking temperature is 105°-110° C. The solubility of the 1.1:1 interpolymer in boiling xylene is less than 1%.

*Example II*

A silver-lined high pressure reactor is charged with 0.2 part of benzoyl peroxide and 200 parts of water, filling half the free space in the reactor. The reactor is then closed and 2 parts of ethylene is admitted, followed by 100 parts of vinyl fluoride. The temperature is raised to 80° C. and pure deoxygenated water is then injected to bring the pressure to 300 atmospheres. As the reaction proceeds the pressure falls, and additional water is injected as often as necessary to maintain the pressure within the range 250-300 atmospheres. When the pressure becomes constant, indicating that the reaction is complete, the reactor is cooled, pressure is released, and the product is discharged. The product is a vinyl fluoride-ethylene interpolymer in the form of a white cake which can be pressed at 200° C. to give transparent films, which resemble polyvinyl fluoride in stiffness and toughness. The sticking temperature, 175°-190° C., is about the same as that of polyvinyl fluoride, but the melt viscosity at 200° C. is lower than that of polyvinyl fluoride prepared under the same conditions. Furthermore, the interpolymer, although insoluble in xylene, is more soluble than polyvinyl fluoride in dimethyl formamide. These properties render the interpolymer more readily workable than polyvinyl fluoride, yet the interpolymer is very stable and can be heated at 200° C. for 5 minutes without discoloration.

*Example III*

A reactor similar to that described in Example I is swept with oxygen-free nitrogen and charged with 100 parts of anhydrous benzene and 0.1 part of diethyl peroxide. The charge occupies approximately one-fourth of the internal volume of the reactor. After closure the nitrogen is removed by evacuation to constant pressure and vinyl fluoride is introduced until the external pressure reaches one atmosphere. Purified ethylene (containing less than 20 P. P. M. of oxygen) is then admitted from high pressure storage to provide a total pressure of about 150 atmospheres. The reactor is then agitated and heated until the internal temperature reaches 125° C. and the pressure in the reactor is then raised to 600 atmospheres by injection of the requisite quantity of ethylene. The reaction is continued at 125° C. and additional ethylene is injected as often as is required to maintain the pressure within the range of 500-600 atmospheres. The sum of the individual pressure drops over a period of 17 hours is about 570 atmospheres. The reaction vessel is cooled to room temperature, the unreacted portion of the gaseous monomers is bled off and the white cake of vinyl fluoride-ethylene interpolymer is removed and washed with acetone and dried under vacuum at 100° C. to yield 54 parts of dry product.

The vinyl fluoride-ethylene interpolymer thus obtained contains 1.2% fluorine, corresponding to 2.9% of vinyl fluoride by weight. The interpolymer can be pressed at 130° C. under a pressure of 5000 lbs./sq. in. to obtain a very tough, pliable film possessing a tensile strength of 35,600 lbs./sq. in. based on break dimensions or 4370 lbs./sq. in. based on original dimensions. When this interpolymer is melt spun, an oriented monofil is obtained possessing a tenacity of 3.8-4.0 grams per denier at 12-14% elongation.

*Example IV*

A reactor similar to that described in Example I is swept with nitrogen and charged with 25 parts of deoxygenated water, 30 parts of freshly distilled methyl methacrylate, 0.1 part of benzoyl peroxide, and (after closing and evacuating to constant pressure to remove the nitrogen) 30 parts of vinyl fluoride. The reactor is connected to a water filled system consisting of connecting lines, a pressure gauge, and a rupture disc assembly. This system is connected through a valve to a source of pure deoxygenated water at a pressure of 1000 atmospheres. Agitation and heating are begun, and when the internal temperature reaches 80° C., sufficient water is injected from the high pressure reservoir to raise the pressure in the reaction system to 950 atmospheres. Initiation of the reaction is indicated by a drop in the pressure of the system, and when this falls to 750 atmospheres, water is again injected to bring the pressure within the range 750-950 atmospheres. During 8.25 hours at 79°-83° C. the total of the individual pressure drops occurring between repressurings is 1215 atmospheres. By this time the reaction is proceeding very slowly and is essentially complete. The reactor is cooled, and the unreacted portion of the vinyl fluoride is bled off. When the reactor is opened and heated somewhat to soften the product, the vinyl fluoride-methyl methacrylate interpolymer expands due to the vapor pressure of the dissolved unreacted monomer and is obtained in the form of a very bulky, spongy mass. In this form the interpolymer is useful for floats, etc., as the cells are filled with gas and are non-interconnecting.

The vinyl fluoride-methyl methacrylate interpolymer is freed of unreacted monomers by heating under reduced pressure at 100° C. There is obtained 38 parts of a tough white solid interpolymer which contains 11.88% fluorine; hence, the molar ratio of vinyl fluoride to methyl methacrylate in the interpolymer is 1.1:1. The interpolymer can be molded at 170° C. and 2000 lbs./sq. in. to give tough transparent objects. The softening temperature, determined by a special method for methyl methacrylate products described in Johnston application Serial No. 472,161, filed January 12, 1943, is 103° C. Unmodified polymethyl methacrylate commonly softens at about 80° C. in this same test.

Example V

A stainless steel, high pressure reactor is flushed with oxygen-free nitrogen and charged with 25 parts of deoxygenated distilled water and 0.1 part of benzoyl peroxide. The water occupies approximately one-fourth of the total internal volume of the reactor. The reactor is closed, the nitrogen is removed by evacuating to constant pressure, and 20 parts of vinyl fluoride and 20 parts of tetrafluoroethylene are then admitted successively, cooling the reactor if necessary. The reactor is agitated and heated to a temperature of 80° C. When the temperature of 60° C. is reached during the period in which the mixture is heating up, water is injected into the reaction system to raise the pressure to 1000 lbs./sq. in. When the temperature reaches 80° C., the pressure is raised to 2000 lbs./sq. in. by further injection of water. During 8 hours in which the temperature is maintained in the range 79°–80° C., and the pressure is maintained in the range 1800–2100 lbs./sq. in. by intermittent injection of water, the total of the individual pressure drops is about 1525 lbs./sq. in. When the pressure drop ceases the reactor is cooled, the unpolymerized portion of the charge is bled off as a gas, and the solid product is discharged. There is obtained 15 parts of a white vinyl fluoride-tetrafluoroethylene interpolymer which contains 61.42% fluorine, or 55.2% vinyl fluoride by weight. The molar ratio of vinyl fluoride to tetrafluoroethylene in the interpolymer is 2.7:1. This interpolymer is nonflammable, as distinguished from pure vinyl fluoride polymer which burns with a slow flame. It can be pressed at 210° C. and 10,000 lbs./sq. in. into a smooth, clear, pliable film which is very tough. The sticking temperature is 170°–185° C. The film has a tensile strength of 5500 lbs./sq. in., based on original dimensions, and an elongation of about 300%. It can be pressed for ten minutes or more at 205°–215° C. without apparent adverse effect on its physical properties. In this respect it is superior to most synthetic polymeric materials known to the art. The film can be oriented by cold drawing.

Example VI

A stainless steel-lined high pressure reactor is swept with oxygen-free nitrogen and charged with 150 parts of deoxygenated water, 25 parts of freshly distilled vinyl acetate, and 0.1 part of benzoyl peroxide. The water occupies approximately one-third of the total volume of the reactor. After closing, the reactor is evacuated to constant pressure to remove the nitrogen, and 107 parts of vinyl fluoride is admitted. The reaction mixture is heated to 80° C. and water is injected to raise the pressure to 300 atmospheres. Repressuring with additional water is then accomplished as often as is necessary to maintain the pressure at 250–300 atmospheres for a total of 7 hours. The combined pressure drops amount to 220 atmospheres. After completion of the reaction the pressure is released and the product discharged. There is obtained 39.5 parts of a tough, clear, spongy material containing after drying 26.15% fluorine, corresponding to 63.3% vinyl fluoride by weight in the interpolymer. The molar ratio of vinyl fluoride to vinyl acetate is 3.25:1. When the product is pressed for 3 minutes at 200° C. and 10,000 lbs./sq. in., a clear, yellow film having good toughness and some elastomeric properties is obtained.

Vinyl fluoride-vinyl acetate interpolymers can be readily hydrolyzed to hydroxyl-containing vinyl fluoride interpolymers as illustrated by the following.

Ten parts of the vinyl fluoride-vinyl acetate interpolymer prepared as above is dissolved in a mixture of 4 parts of water, 22.4 parts of methanol, 135 parts of benzene. Six parts of potassium hydroxide dissolved in 20 parts of methanol is added with stirring under reflux. The hydrolyzed vinyl fluoride-vinyl acetate interpolymer begins to precipitate almost immediately. After continuing the refluxing and stirring for one hour the solvent is removed from the product by steam distillation and is washed free from alkali and dried. The hydrolyzed product is soluble in dimethyl formamide, dioxan, pyridine, a 2:1 mixture of methyl ethyl ketone and dioxan, and a 2:1 mixture of methyl ethyl ketone and methoxy ethanol. A film cast from a 10% solution of the hydrolyzed product with dimethyl formamide gives a permanent cold draw. The drawn film has a tenactly of 3.6 grams per denier at 7% elongation. This product has a sticking temperature of 182° C. in comparison with less than 50° C. for the unhydrolyzed interpolymer.

Example VII

A stainless steel high pressure reactor is swept with oxygen-free nitrogen and charged with 25 parts of deoxygenated water, 30 parts of freshly distilled vinyl acetate, and 0.1 part of benzoyl peroxide. The water occupies approximately one-fourth of the total internal volume of the reactor. After closing, the reactor is evacuated to constant pressure to remove the nitrogen, and 15 parts of vinyl fluoride is admitted through the valve. Ethylene is then admitted to give a total pressure of 50 atmospheres at room temperature. The reactor is then agitated and heated to maintain a temperature in the range of 78°–81° C. for 13 hours. At the end of this time it is cooled to the temperature of dry ice and acetone before opening. As the reactor warms up to room temperature, the product expands due to the presence of a small amount of dissolved unreacted monomer and is obtained in the form of a very spongy, rubbery mass. The cells are filled with gas and are non-interconnecting.

This interpolymer of vinyl fluoride, vinyl acetate, and ethylene is freed of any remaining unreacted monomers by heating to 100° C. under diminished pressure. There is obtained 31 parts of a clear elastomeric interpolymer which contains 7.185% fluorine, 59.70% carbon, and 8.70% hydrogen, corresponding to a molar ratio of vinyl fluoride to vinyl acetate to ethylene of 1:1:1.6. This interpolymer is tacky and has a good snap; it retracts rapidly almost to its original dimensions after being elongated 700 or 800%.

A wide variety of polymerizable organic compounds having at least one ethylenic double bond can be interpolymerized by the present process with vinyl fluoride to yield the high molecular weight solid polymers described herein. Examples of these ethylenic compounds comprise monoethylenic hydrocarbons, e. g., ethylene, propylene, butylenes, pentenes, and styrene; halogen-substituted ethylenes, e. g., vinyl chloride, vinyl bromide, 1,1-dichloroethylene, 1,1-difluoroethylene, difluorochloroethylene, trifluoroethylene, and tetrafluoroethylene; vinyl esters of organic acids, e. g., vinyl formate, vinyl acetate, vinyl benzoate, and vinyl esters of inorganic acids; vinyl ethers, e. g., vinyl ethyl ether and vinyl dioxolane; vinyl ketones, e. g., methyl vinyl ketone; N-vinyl imides, e. g., N-vinylsuccinimide and N-vinyl-phthalimide; acrylic and methacrylic acids and their derivatives, e. g., esters, nitriles, amides, anhydrides, and acid halides, including methyl methacrylate, allyl methacrylate, acrylonitrile, N-butyl methacrylamide, chloroacrylyl chloride, etc.; derivatives of maleic and fumaric acid, e. g., maleic anhydride, diethyl maleate, and dimethyl fumarate; compounds having more than one ethylenic double bond, e. g., butadiene, chloroprene, divinyl benzene, and cyclopentadiene, and compounds containing acetylenic unsaturation in addition to the ethylenic double bond, e. g., monovinylacetylene, divinylacetylene, dialkyl(vinylethinyl) carbinols, etc.

The most valuable application of the invention resides in the new vinyl fluoride copolymers previously referred to which are obtained by the interpolymerization of terminally unsaturated olefins with vinyl fluoride. The thermal stability and other properties of these vinyl fluoride-olefin interpolymers are not to be expected either from a knowledge of the properties of the interpolymers of vinyl chloride, vinyl bromide, etc., or from the previous data concerning the chemical stability of aliphatic compounds having only one fluorine atom per carbon atom.

A number of vinyl polymerization catalysts may be employed to bring about the interpolymerization. Examples are peroxy compounds, including diacyl peroxides, such as dibenzoyl peroxide, benzoyl acetyl peroxide, and dipropionyl peroxide; dialkyl peroxides, such as diethyl peroxide and dipropyl peroxide; inorganic peroxides, e. g., hydrogen peroxide, or peroxides such as barium peroxide, magnesium peroxide, and zinc peroxide, which are especially effective if used in conjunction with an anhydride of an organic acid; and water-soluble salts of inorganic peroxy acids, such as ammonium persulfate, potassium persulfate, potassium percarbonate, potassium perphosphate, and sodium perborate. Other vinyl polymerization catalysts which can be employed include oxygen; hydrazine salts, e. g., hydrazine sulfate and hydrazine sebacate; amine oxides, e. g., trimethylamine oxide; and organometallic compounds, e. g., lead tetraethyl, lead tetraphenyl, lithium butyl, silver acetylide, etc. The catalyst should be employed in an amount in excess of 0.005% (based on the total weight of monomers) of benzoyl peroxide or of its molecular equivalent of another catalyst, and preferably there is employed between 0.05% and 2% and not more than 5% of the catalyst. Although oxygen in amounts of 100–5000 P. P. M. based on the weight of monomers can be used as a catalyst for the interpolymerization, less than 1000 P. P. M. of oxygen are preferred as larger amounts generally have a deleterious effect on the polymerization and on the properties of the polymer. With some interpolymer ingredients light or heat alone may serve as a catalyst for the interpolymerization.

Promoters, although not necessary, may be used in conjunction with the catalysts to increase the yield or decrease the reaction time; examples are reducing agents, e. g., sodium bisulfite, sulfur dioxide, etc., acetylenic alcohols, e. g., propargyl alcohol, and metal carbonyls, e. g., nickel carbonyl, iron carbonyl; etc.

The optimum temperatures and pressures will depend upon the nature of the compound to be interpolymerized with vinyl fluoride, as well as upon the catalyst or combination of catalysts selected. With easily polymerizable liquids such as the vinyl esters, a pressure of 50 atmospheres is adequate, whereas with interpolymer components that are gaseous under normal conditions, e. g., tetrafluoroethylene, pressures of the order of 100 atmospheres or more are used. In general, the proportion of vinyl fluoride in the interpolymers increases with increasing vinyl fluoride pressure and the molecular weight of the products is likewise increased by the use of higher pressures. With any interpolymer component, pressures of 100 atmospheres, or greater are generally preferred for these reasons, and even 1000 atmospheres or greater pressures can be used to advantage. With ethylene, for example, the vinyl fluoride interpolymers obtained at pressures in the range of 250–1000 atmospheres are most useful.

The temperature is adjusted to give a controllable rate of reaction, and the optimum temperature depends to a large extent upon the catalyst employed. In general, the preferred temperature range is from 30° to 200° C. With peroxy-type catalysts, temperatures from 50° to 150° C. are most suitable. Other catalysts such as oxygen or hydrazine salts are preferably used at temperatures of 100°–200° C.

A liquid polymerization medium, although not necessary, is beneficial when the monomer to be interpolymerized with the vinyl fluoride is also a gas, since it aids in dispersing the catalyst and in controlling the reaction temperature by dissipating the liberated heat. Even with monomers which are not gaseous, an inert liquid diluent or dispersing medium is usually advantageous, and water is especially useful for this purpose. With aqueous media, buffers or dispersing agents may be employed. Soaps, alkanesulfonic acids or their salts, sodium alkyl sulfates, quaternary ammonium salts containing a long hydrocarbon chain, alkyl betaines, long chain primary alcohols, polyvinyl alcohol, etc., may be used in this connection.

Inert organic liquid media can be used instead of water, e. g., petroleum ether, benzene, or tert.-butyl alcohol. Many organic compounds react with the growing polymer chain through a process known as telomerization, and by using such solvents as carbon tetrachloride, bromoform, ethyl orthosilicate, etc., with or without inert diluents, it is possible to modify the properties of the interpolymers and even to obtain radically different products of relatively low molecular weight (telomers). The degree of modification depends partly upon the nature of the solvent used, and partly upon the reaction conditions, e. g., relative concentration of solvent, chosen. Oxygenated solvents, e. g., acetone, dioxane and methyl formate, give a very slight degree of modification as compared with the halogenated solvents, e. g., carbon tetrachloride.

The vinyl fluoride should be reasonably pure and substantially free of acetylene, hydrogen fluoride, and oxygen. The apparatus may be constructed of any material capable of withstanding the pressures employed, and the polymerization chamber may be lined with any material, such as mild steel, stainless steel, silver, nickel, lead, aluminum, tantalum, platinum, palladium, beryllium, chromium, glass porcelain, or enamel, which will not adversely affect the rate of polymerization or the quality of the product. It is preferably equipped with some means of providing agitation.

The interpolymers of vinyl fluoride may be obtained batchwise or by a continuous process. One or more of the reactants may be added portionwise or continuously during the polymerization and the reactor can be discharged at intervals. Thus, the pressure can be maintained constant or within a desired range by continuously or intermittently injecting vinyl fluoride or another reaction component or mixture of components during the reaction. Alternatively, a mixture of the reactants can be passed continuously through a zone which is maintained at reaction conditions, and which is provided with baffles, stirrers, or other means of agitation. Continuous operation possesses many technical advantages, such as speed and economy of operation, accurate control of the reaction and of the proportions of reactants, and flexibility of operation.

The olefin-vinyl fluoride interpolymers obtainable by the present process are adapted to a wide variety of uses. For example, they can be molded under elevated temperature and pressure into films, foils, sheets, ribbons, bands, molded objects such as rods, tubing, and massive articles, or applied as a coating to fabrics, leather, cellulose products, etc. They may also be used in the form of extruded filaments or fibers, and some of these may be oriented by stretching, rolling, pressing, etc., to increase their tensile strength and elasticity. Interpolymers of vinyl fluoride with olefins have generally increased solubility with respect to polyvinyl fluoride and can be dissolved in a wider variety of solvents for spinning into fibers or casting into films. The vinyl fluoride interpolymers can be used alone, or they can be mixed with or prepared in the presence of other ingredients such as cellulose derivatives, resins, plasticizers, stabilizers, modifiers, pigments, filling materials, dyes, etc.

As many apparently widely different embodiments of this invention may be made without departing from the spirit and scope thereof, it is to be understood that we do not limit ourselves to the specific embodiments thereof except as defined in the appended claims.

We claim:

1. A process for obtaining polymeric material from vinyl fluoride which comprises heating a mixture of vinyl fluoride with a terminally unsaturated olefin in contact with an inert liquid medium and from 0.005% to 5% based on the weight of the vinyl fluoride and said olefin of a vinyl polymerization catalyst under a pressure of from 100 to 1000 atmospheres and at a temperature of from 30° C. to 200° C., said mixture containing, on the basis of the weight of the vinyl fluoride and said olefin, from 3% to 95% of vinyl fluoride.

2. The process set forth in claim 1 in which said liquid reaction medium is water.

3. The process set forth in claim 1 in which said olefin contains not more than five carbon atoms and is normally gaseous.

4. The process set forth in claim 1 in which said olefin is ethylene.

5. A composition of matter comprising a solid high molecular weight interpolymer which is capable of being heat pressed into strong tough films and which is the polymerization product of a mixture of vinyl fluoride and a terminally unsaturated olefin, said mixture containing, on the basis of the weight of the vinyl fluoride and said olefin, from 3% to 95% of vinyl fluoride.

6. The composition set forth in claim 5 in which said olefin is a terminally unsaturated olefinic hydrocarbon containing not more than 5 carbon atoms.

7. The composition set forth in claim 5 in which said olefin is a normally gaseous terminally unsaturated monoolefinic hydrocarbon.

8. The composition set forth in claim 5 in which said olefin is ethylene.

DONALD D. COFFMAN.
THOMAS A. FORD.

REFERENCES CITED

The following references are of record in the file of this patent:

UNITED STATES PATENTS

| Number | Name | Date |
|---|---|---|
| 2,200,429 | Perrin et al. | May 14, 1940 |
| 2,224,663 | Berg et al. | Dec. 10, 1940 |
| 2,279,884 | D'Alelio | Apr. 14, 1942 |
| 1,425,130 | Plauson | Aug. 8, 1922 |
| 2,362,960 | Thomas | Nov. 14, 1944 |

OTHER REFERENCES

Starkweather, article in Jour. Am. Chem. Soc., vol. 56, pages 1870–1874, 1934.